United States Patent
Danforth et al.

(10) Patent No.: US 9,300,541 B2
(45) Date of Patent: Mar. 29, 2016

(54) SYSTEM AND METHOD FOR AUTOMATICALLY LEARNING AND MAINTAINING IP ADDRESS ALLOCATION TOPOLOGY

(71) Applicant: Time Warner Cable Enterprises LLC, New York, NY (US)

(72) Inventors: Andrew C. Danforth, Chantilly, VA (US); Christopher G. Turner, Leesburg, VA (US); Clayton O'Neill, Fairfax, VA (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 358 days.

(21) Appl. No.: 13/631,103

(22) Filed: Sep. 28, 2012

(65) Prior Publication Data

US 2014/0095717 A1    Apr. 3, 2014

(51) Int. Cl.
| | |
|---|---|
| G06F 15/173 | (2006.01) |
| H04L 12/24 | (2006.01) |
| H04L 29/12 | (2006.01) |
| G06F 15/16 | (2006.01) |

(52) U.S. Cl.
CPC .............. H04L 41/12 (2013.01); *G06F 15/16* (2013.01); *H04L 29/12273* (2013.01); *H04L 61/2015* (2013.01)

(58) Field of Classification Search
None
See application file for complete search history.

(56) References Cited

U.S. PATENT DOCUMENTS

| | | | |
|---|---|---|---|
| 6,775,276 B1 * | 8/2004 | Beser | H04L 61/2015 370/389 |
| 7,107,326 B1 * | 9/2006 | Fijolek | H04L 61/2015 709/220 |
| 7,640,340 B1 * | 12/2009 | Stapp | H04L 29/12273 709/222 |
| 7,792,963 B2 | 9/2010 | Gould | |
| 7,895,665 B2 | 2/2011 | Gould | |
| 2002/0143905 A1 | 10/2002 | Govindarajan | |
| 2002/0161879 A1 | 10/2002 | Richard | |
| 2003/0043820 A1 | 3/2003 | Goringe | |
| 2003/0056217 A1 | 3/2003 | Brooks | |
| 2003/0097438 A1 | 5/2003 | Bearden | |
| 2003/0147421 A1 * | 8/2003 | Gutknecht | H04L 29/12273 370/468 |
| 2003/0156552 A1 | 8/2003 | Banker | |

(Continued)

OTHER PUBLICATIONS

Cable Television Laboratories, Inc., PacketCable™ Specification,Multimedia Specification: Jun. 29, 2011, PXT-SP-MM-I06-110629, pp. 1-157.

(Continued)

*Primary Examiner* — Ranodhi Serrao
*Assistant Examiner* — James Fiorillo
(74) *Attorney, Agent, or Firm* — Otterstedt, Ellenbogen & Kammer, LLP

(57) ABSTRACT

A topology map engine obtains, from a dynamic host control protocol relay device, a relayed request, of a client, for a dynamic host control protocol lease. The relayed request has at least one given IP address of the dynamic host control protocol relay device inserted therein. A search is made in a database for that IP address. If not found, dynamic host control protocol relay device information is obtained. This information includes: an identifier of the dynamic host control protocol relay device; and at least one network interface of the dynamic host control protocol relay device and any internet protocol addresses assigned to same. This information is obtained at the topology map engine and stored in the database.

33 Claims, 9 Drawing Sheets

(56) References Cited

U.S. PATENT DOCUMENTS

| | | | |
|---|---|---|---|
| 2004/0064559 A1* | 4/2004 | Kupst | H04L 29/12216 709/226 |
| 2004/0151202 A1 | 8/2004 | Mandavilli | |
| 2004/0196865 A1 | 10/2004 | Natarajan | |
| 2005/0013310 A1 | 1/2005 | Banker | |
| 2005/0021855 A1* | 1/2005 | Wang | H04L 61/2015 709/245 |
| 2005/0169193 A1 | 8/2005 | Black | |
| 2005/0243739 A1 | 11/2005 | Anderson | |
| 2006/0130107 A1 | 6/2006 | Gonder | |
| 2006/0133299 A1 | 6/2006 | Son | |
| 2006/0218252 A1* | 9/2006 | Ford | H04L 61/2015 709/220 |
| 2007/0189190 A1 | 8/2007 | Feng | |
| 2007/0217436 A1 | 9/2007 | Markley | |
| 2008/0025299 A1* | 1/2008 | Agarwal | H04L 29/1282 370/389 |
| 2008/0065747 A1* | 3/2008 | Kubota | H04L 29/1282 709/220 |
| 2008/0232262 A1 | 9/2008 | Beygelzimer | |
| 2009/0103451 A1 | 4/2009 | Liu | |
| 2009/0180399 A1 | 7/2009 | Li | |
| 2009/0210518 A1* | 8/2009 | Verma | H04L 29/12028 709/220 |
| 2009/0248794 A1 | 10/2009 | Helms | |
| 2009/0285127 A1 | 11/2009 | Black | |
| 2009/0290513 A1 | 11/2009 | Swan | |
| 2009/0316602 A1 | 12/2009 | Nandy | |
| 2010/0014424 A1 | 1/2010 | Agrawal | |
| 2010/0020722 A1 | 1/2010 | Farkas | |
| 2010/0191857 A1 | 7/2010 | Donin De Rosiere | |
| 2010/0313236 A1 | 12/2010 | Straub | |
| 2011/0141944 A1 | 6/2011 | Feng | |
| 2012/0023207 A1* | 1/2012 | Gandhewar | H04L 61/2038 709/221 |
| 2012/0110146 A1 | 5/2012 | Tian | |
| 2012/0317254 A1* | 12/2012 | Chekhanovskiy | H04L 61/1511 709/222 |
| 2013/0097674 A1* | 4/2013 | Jindal | G06F 15/16 726/4 |
| 2013/0103843 A1* | 4/2013 | Rebbereh | H04L 61/2038 709/227 |
| 2013/0159409 A1* | 6/2013 | Kelkar | H04L 61/6013 709/204 |
| 2013/0166737 A1* | 6/2013 | Christenson | H04L 69/40 709/224 |

OTHER PUBLICATIONS

Wikipedia "Dynamic Host Configuration Protocol," Apr. 4, 2012, downloaded Apr. 20, 2015 from http://web.archive.org/web/20120405011730/https://en.wikipedia.org/wiki/DHCP.

* cited by examiner

SYSTEM AND METHOD FOR AUTOMATICALLY LEARNING AND MAINTAINING IP ADDRESS ALLOCATION TOPOLOGY

FIELD OF THE INVENTION

The present invention relates generally to communications systems and methods, and, more particularly, to Internet Protocol (IP) address allocation techniques and the like.

BACKGROUND OF THE INVENTION

Until fairly recently, the cable network was predominantly a vehicle for delivering entertainment. With the advent of the Internet and the rise in demand for broadband two-way access, the cable industry began to seek new ways of utilizing its existing plant. Pure coaxial ("coax") cable networks were replaced with hybrid fiber networks (HFNs) using optical fiber from the head end to the demarcation with the subscriber coax (usually at a fiber node). Currently, a content-based network, a non-limiting example of which is a cable television network, may afford access to a variety of services besides television, for example, broadband Internet access, telephone service, and the like.

One significant issue for a cable operator desiring to provide digital service is the configuration of its network. Designed for one-way delivery of broadcast signals, the existing cable network topology was optimized for downstream (toward the subscriber) only service. New equipment had to be added to the network to provide two-way communication. To reduce the cost of this equipment and to simplify the upgrade of the broadcast cable for two-way digital traffic, standards were developed for a variety of new cable-based services. The first of these standards, the Data Over Cable System Interface Standard (DOCSIS® standard), was released in 1998. DOCSIS® establishes standards for cable modems and supporting equipment. DOCSIS® (Data Over Cable Service Interface Specification) is a registered mark of Cable Television Laboratories, Inc., 400 Centennial Parkway Louisville Colo. 80027, USA, and will be referred to for the remainder of this application in capital letters, without the ® symbol, for convenience.

IP addresses are allocated in blocks known as subnets or prefixes on a network. These addresses are regularly allocated and moved as part of network growth and expansion. A cable modem termination system or CMTS is a piece of equipment typically located in a cable company's head end or hub site, and used to provide high speed data services, such as cable Internet or voice over Internet Protocol (VoIP), to cable subscribers. A CMTS provides many of the same functions provided by the digital subscriber line access multiplexer (DSLAM) in a digital subscriber line (DSL) system.

On a DOCSIS network, IP subnets are allocated on a per-CMTS basis.

SUMMARY OF THE INVENTION

Principles of the present invention provide a system and method for automatically learning and maintaining IP address allocation topology. In one aspect, an exemplary method includes the step of obtaining, at a topology map engine, from a dynamic host control protocol relay device, a relayed request, of a client, for a dynamic host control protocol lease. The relayed request has at least one given internet protocol address of the dynamic host control protocol relay device inserted therein. A further step includes searching, in a database, for the at least one given internet protocol address of the dynamic host control protocol relay device. A still further step includes, if the at least one given internet protocol address of the dynamic host control protocol relay device is not found in the database in the searching step, obtaining, at the topology map engine, from the dynamic host control protocol relay device, dynamic host control protocol relay device information. This information includes at least an identifier of the dynamic host control protocol relay device; at least one network interface of the dynamic host control protocol relay device; and any internet protocol address assigned to the at least one network interfaces of the dynamic host control protocol relay device. The dynamic host control protocol relay device information is stored in the database.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus (e.g., a topology map engine server) including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of the following technical benefits:

- more accurate and complete knowledge of topology information;
- ease in consolidation of topology information to make same available to multiple other systems;
- persistence of historical data;
- real-time tracking of changes;
- ability to discover statically allocated addresses (e.g., for commercial customers)
  - can learn of a cable modem termination system (CMTS) or the like by watching dynamic lease allocation, and then during communication with the CMTS discover subnets and prefixes that are allocated statically.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

IP-based data services may be provided over a variety of networks. Purely by way of example and not limitation, embodiments will be shown in the context of a cable multi-service operator (MSO) providing data services as well as entertainment services. However, one or more embodiments are applicable in a variety of network contexts; for example, fiber optic networks, wireless networks, DSL networks, and the like; indeed, any IP network situation where an access device relays DHCP traffic within a network that carries data (and optionally, other information such as video programming; indeed, as discussed below, some embodiments are applicable to video content networks that are not carrying separate Internet traffic but are utilizing DHCP requests in connection with the transmission of video).

Figure 1:
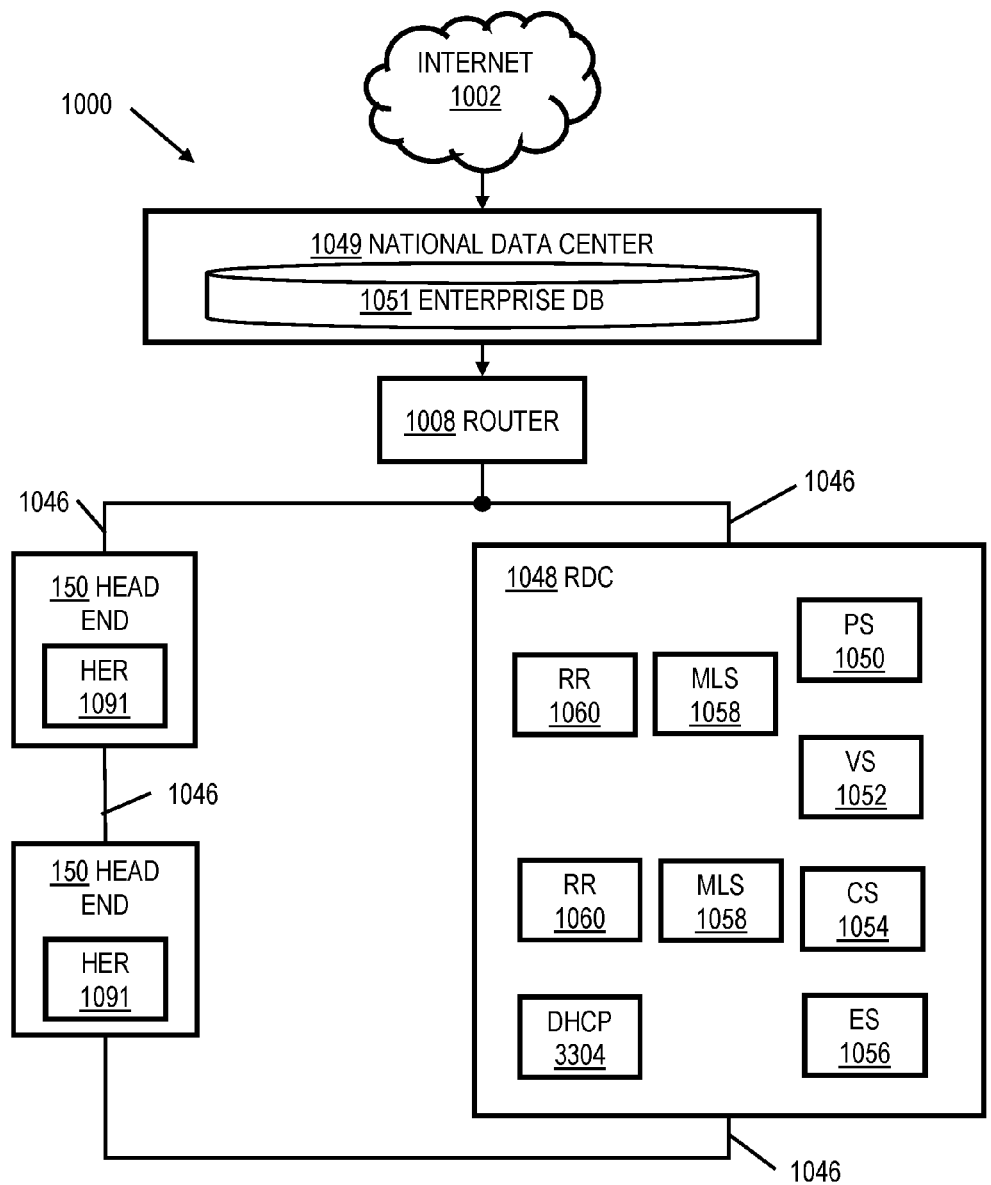
FIG. 1 is a block diagram of an exemplary embodiment of a system, within which one or more aspects of the invention can be implemented.

FIG. 1 shows an exemplary system 1000, according to an aspect of the invention. System 1000 includes a regional data center (RDC) 1048, and one or more divisions, represented by division head ends 150. RDC 1048 and head ends 150 are interconnected by a network 1046; by way of example and not limitation, a dense wavelength division multiplex (DWDM) network. Elements 1048, 150 on network 1046 may be operated, for example, by or on behalf of a cable MSO, and may be interconnected with a global system of interconnected computer networks that use the standardized Internet Protocol Suite (TCP/IP) (transfer control protocol/Internet protocol), commonly called the Internet 1002; for example, via router 1008. In one or more non-limiting exemplary embodiments, router 1008 is a point-of-presence ("POP") router; for example, of the kind available from Juniper Networks, Inc., Sunnyvale, Calif., USA.

Head ends 150 may each include a head end router (HER) 1091 which interfaces with network 1046. Head end routers 1091 are omitted from FIGS. 2-5 below to avoid clutter.

RDC 1048 may include one or more provisioning servers (PS) 1050, one or more Video Servers (VS) 1052, one or more content servers (CS) 1054, and one or more e-mail servers (ES) 1056. The same may be interconnected to one or more RDC routers (RR) 1060 by one or more multi-layer switches (MLS) 1058. RDC routers 1060 interconnect with network 1046.

Figure 2:
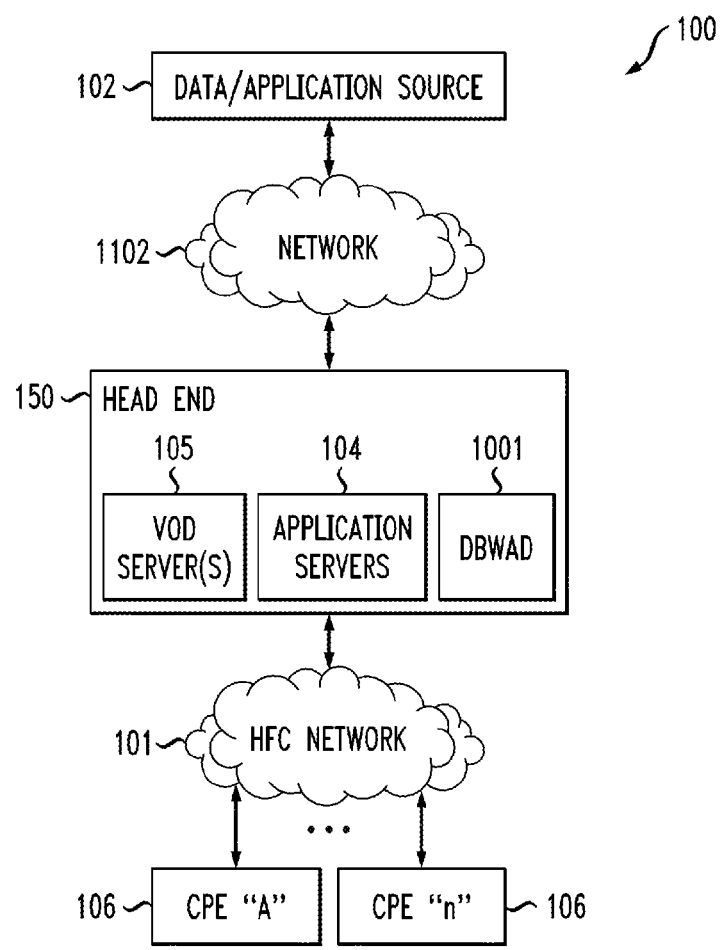
FIG. 2 is a functional block diagram illustrating an exemplary hybrid fiber-coaxial (HFC) divisional network configuration, useful within the system of FIG. 1.

FIG. 2 is a functional block diagram illustrating an exemplary content-based (e.g., hybrid fiber-coaxial (HFC)) divisional network configuration, useful within the system of FIG. 1. See, for example, US Patent Publication 2006/0130107 of Gonder et al., entitled "Method and apparatus for high bandwidth data transmission in content-based networks," the complete disclosure of which is expressly incorporated by reference herein in its entirety for all purposes. The various components of the network 100 include (i) one or more data and application origination points 102; (ii) one or more application distribution servers 104; (iii) one or more video-on-demand (VOD) servers 105, and (v) consumer premises equipment or customer premises equipment (CPE) 106. The distribution server(s) 104, VOD servers 105 and CPE(s) 106 are connected via a bearer (e.g., HFC) network 101. Servers 104, 105 can be located in head end 150. A simple architecture is shown in FIG. 2 for illustrative brevity, although it will be recognized that comparable architectures with multiple origination points, distribution servers, VOD servers, and/or CPE devices (as well as different network topologies) may be utilized consistent with embodiments of the invention. For example, the head-end architecture of FIG. 3 (described in greater detail below) may be used.

The data/application origination point 102 comprises any medium that allows data and/or applications (such as a VOD-based or "Watch TV" application) to be transferred to a distribution server 104, for example, over network 1102. This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill, given the teachings herein. For example, in one or more embodiments, network 1102 may correspond to network 1046 of FIG. 1, and the data and application origination point may be, for example, within RDC 1048 or on the Internet 1002. Head end 150, HFC network 101, and CPEs 106 thus represent the divisions which were represented by division head ends 150 in FIG. 1.

The application distribution server 104 comprises a computer system where such applications can enter the network system. Distribution servers per se are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by a distribution server 104 or a cable modem termination system 156 (discussed below with regard to FIG. 3). Non-limiting examples of CPE are set-top boxes and high-speed cable modems for providing high bandwidth Internet access in premises such as homes and businesses.

Also included (for example, in head end 150) is a dynamic bandwidth allocation device (DBWAD) 1001 such as a global session resource manager, which is itself a non-limiting example of a session resource manager.

Figure 3:
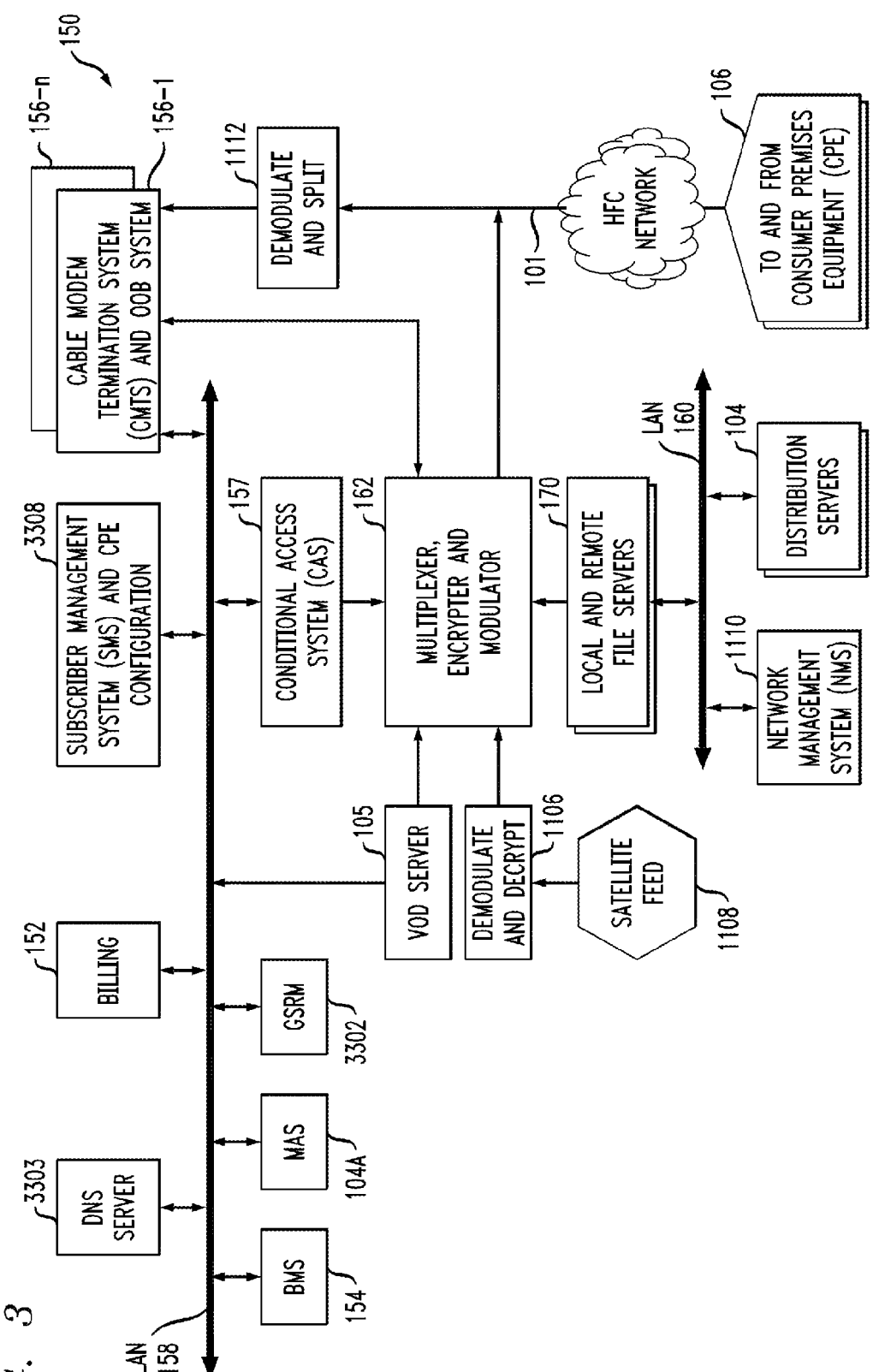
FIG. 3 is a functional block diagram illustrating one exemplary HFC cable network head-end configuration, useful within the system of FIG. 1.

FIG. 3 is a functional block diagram illustrating one exemplary HFC cable network head-end configuration, useful within the system of FIG. 1. As shown in FIG. 3, the head-end architecture 150 comprises typical head-end components and services including billing module 152, subscriber management system (SMS) and CPE configuration management module 3308, cable-modem termination system (CMTS) and out-of-band (OOB) system 156, as well as LAN(s) 158, 160 placing the various components in data communication with one another. In one or more embodiments, there are multiple CMTSes 156-1 through 156-n. Each may be coupled to an HER 1091, for example. See, e.g., FIGS. 1 and 2 of co-assigned U.S. Pat. No. 7,792,963 of inventors Gould and Danforth, entitled METHOD TO BLOCK UNAUTHORIZED NETWORK TRAFFIC IN A CABLE DATA NETWORK, the complete disclosure of which is expressly incorporated herein by reference in its entirety for all purposes.

It will be appreciated that while a bar or bus LAN topology is illustrated, any number of other arrangements (e.g., ring, star, etc.) may be used consistent with the invention. It will also be appreciated that the head-end configuration depicted in FIG. 3 is high-level, conceptual architecture and that each multi-service operator (MSO) may have multiple head-ends deployed using custom architectures.

The architecture 150 of FIG. 3 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (refer to description of FIG. 4) via a variety of interposed network components.

Content (e.g., audio, video, etc.) is provided in each downstream (in-band) channel associated with the relevant service group. (Note that in the context of data communications, internet data is passed both downstream and upstream.) To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville Colo. 80027, USA) and associated protocols (e.g., DOCSIS 1.x, 2.0. or 3.0). The OpenCable™ Application Platform (OCAP) 1.0, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are expressly incorporated herein by reference in their entireties for all purposes.

Furthermore in this regard, DOCSIS is an international telecommunications standard that permits the addition of high-speed data transfer to an existing cable TV (CATV) system. It is employed by many cable television operators to provide Internet access (cable Internet) over their existing hybrid fiber-coaxial (HFC) infrastructure. Use of DOCSIS to transmit data on an HFC system is one non-limiting exemplary application of one or more embodiments. However, one or more embodiments are generally applicable to IP transport of data, regardless of what kind of network is employed.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Also included in FIG. 3 are a global session resource manager (GSRM) 3302, a Mystro Application Server 104A, and a business management system 154, all of which are coupled to LAN 158. GSRM 3302 is one specific form of a DBWAD 1001 and is a non-limiting example of a session resource manager.

An ISP DNS server could be located in the head-end as shown at 3303, but it can also be located in a variety of other places.

A DHCP server 3304 is preferably located in each regional data center 1048 as seen in FIG. 1, but could also be located in different locations (e.g., in national data center 1049 or on LAN 158 or 160 in head end 150). DHCP server 3304 is preferably coupled to national data center 1049 via a backbone network similar to that described in connection with network 1046. DHCP server 3304 preferably communicates with the CMTSes 156 in each head end 150 over network 1046. National data center 1049 can include an enterprise database 1051 to store a variety of enterprise-wide (e.g., MSO-wide) data.

Figure 4:
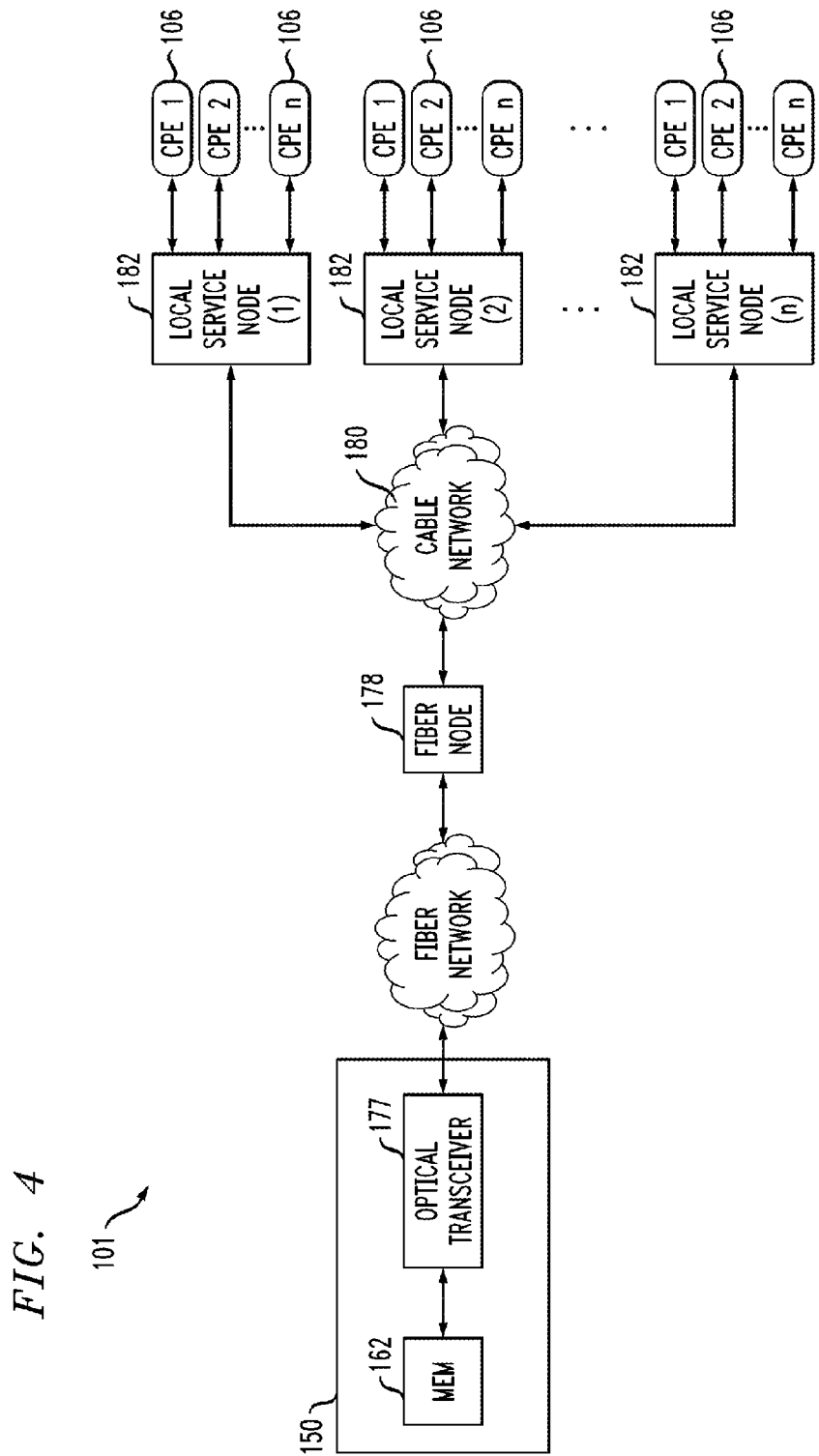
FIG. 4 is a functional block diagram illustrating one exemplary local service node configuration useful within the system of FIG. 1.

As shown in FIG. 4, the network 101 of FIGS. 2 and 3 comprises a fiber/coax arrangement wherein the output of the MEM 162 of FIG. 3 is transferred to the optical domain (such as via an optical transceiver 177 at the head-end 150 or further downstream). The optical domain signals are then distributed over a fiber network to a fiber node 178, which further distributes the signals over a distribution network 180 (typically coax) to a plurality of local servicing nodes 182. This provides an effective 1-to-N expansion of the network at the local service end. Each node 182 services a number of CPEs 106. Further reference may be had to US Patent Publication 2007/0217436 of Markley et al., entitled "Methods and apparatus for centralized content and data delivery," the complete disclosure of which is expressly incorporated herein by reference in its entirety for all purposes. In one or more embodiments, the CPE 106 includes a cable modem, such as a DOCSIS-compliant cable modem (DCCM).

Certain additional aspects of video or other content delivery will now be discussed for completeness, it being understood that embodiments of the invention have broad applicability to IP data communications and transport. Again, delivery of data over a video (or other) content network is but one non-limiting example of a context where one or more embodiments could be implemented. US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture, although it will be recognized by those of ordinary skill that other approaches and architectures may be substituted. In a cable television system in accordance with the Brooks invention, program materials are made available to subscribers in a neighborhood on an as needed basis. Specifically, when a subscriber at a set-top terminal selects a program channel to watch, the selection request is transmitted to a head end of the system. In response to such a request, a controller in the head end determines whether the material of the selected program channel has been made available to the neighborhood. If it has been made available, the controller identifies to the set-top terminal the carrier which is carrying the requested program material, and to which the set-top terminal tunes to obtain the requested program material. Otherwise, the controller assigns an unused carrier to carry the requested program material, and informs the set-top terminal of the identity of the newly assigned carrier. The controller also retires those carriers assigned for the program channels which are no longer watched by the subscribers in the neighborhood. Note that reference is made herein, for brevity, to features of the "Brooks invention"—it should be understood that no inference should be drawn that such features are necessarily present in all claimed embodiments of Brooks. The Brooks invention is directed to a technique for utilizing limited network bandwidth to distribute program materials to subscribers in a community access television (CATV) system. In accordance with the Brooks invention, the CATV system makes available to subscribers selected program channels, as opposed to all of the program channels furnished by the system as in prior art. In the Brooks CATV system, the program channels are provided on an as needed basis, and are selected to serve the subscribers in the same neighborhood requesting those channels.

US Patent Publication 2010-0313236 of Albert Straub, entitled "TECHNIQUES FOR UPGRADING SOFTWARE IN A VIDEO CONTENT NETWORK," the complete disclosure of which is expressly incorporated herein by reference for all purposes, provides additional details on the aforementioned dynamic bandwidth allocation device 1001.

US Patent Publication 2009-0248794 of William L. Helms, entitled "SYSTEM AND METHOD FOR CONTENT SHARING," the complete disclosure of which is expressly incorporated herein by reference for all purposes, provides additional details on CPE in the form of a converged premises gateway device. Related aspects are also disclosed in US Patent Publication 2007-0217436 of Markley et al, entitled "METHODS AND APPARATUS FOR CENTRALIZED CONTENT AND DATA DELIVERY," the complete disclosure of which is expressly incorporated herein by reference for all purposes.

Figure 5:
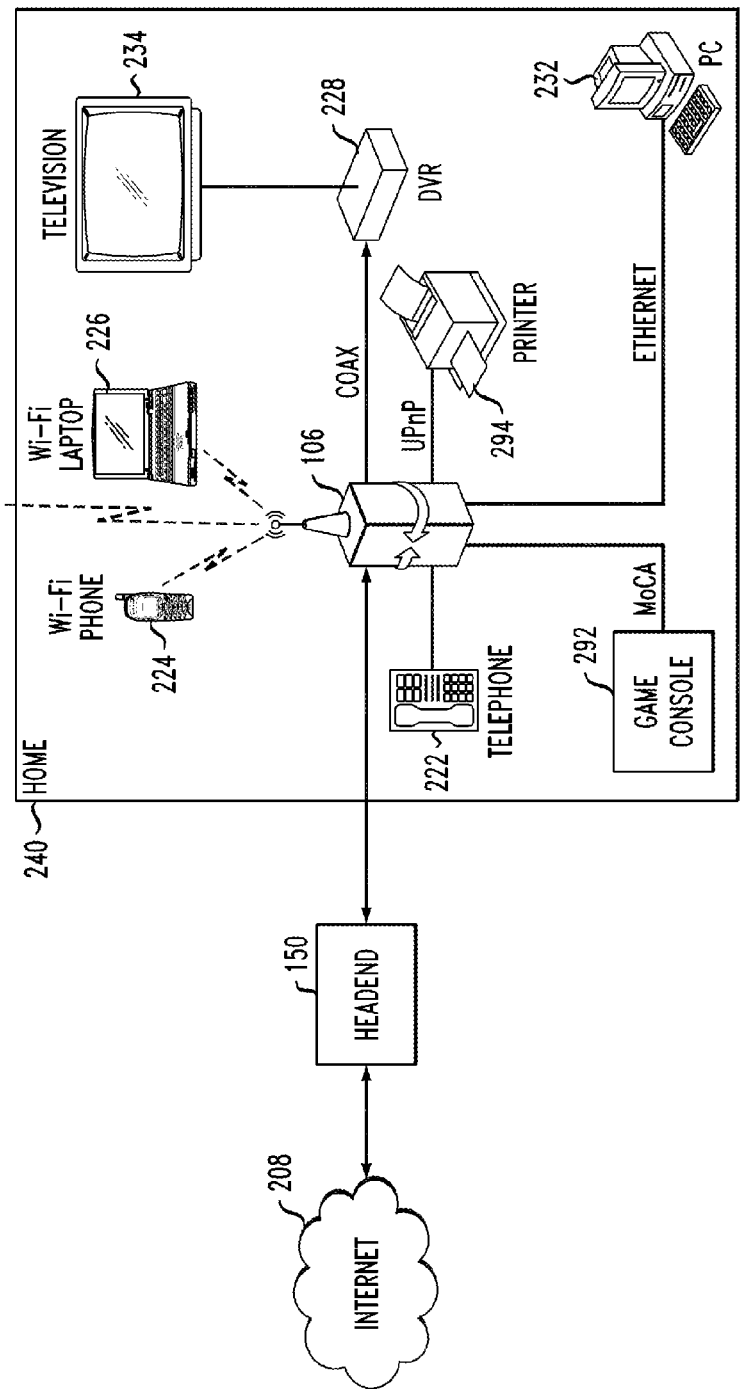
FIG. 5 is a functional block diagram of a premises network, including an exemplary centralized customer premises equipment (CPE) unit, interfacing with a head end such as that of FIG. 3.
Figure 6:
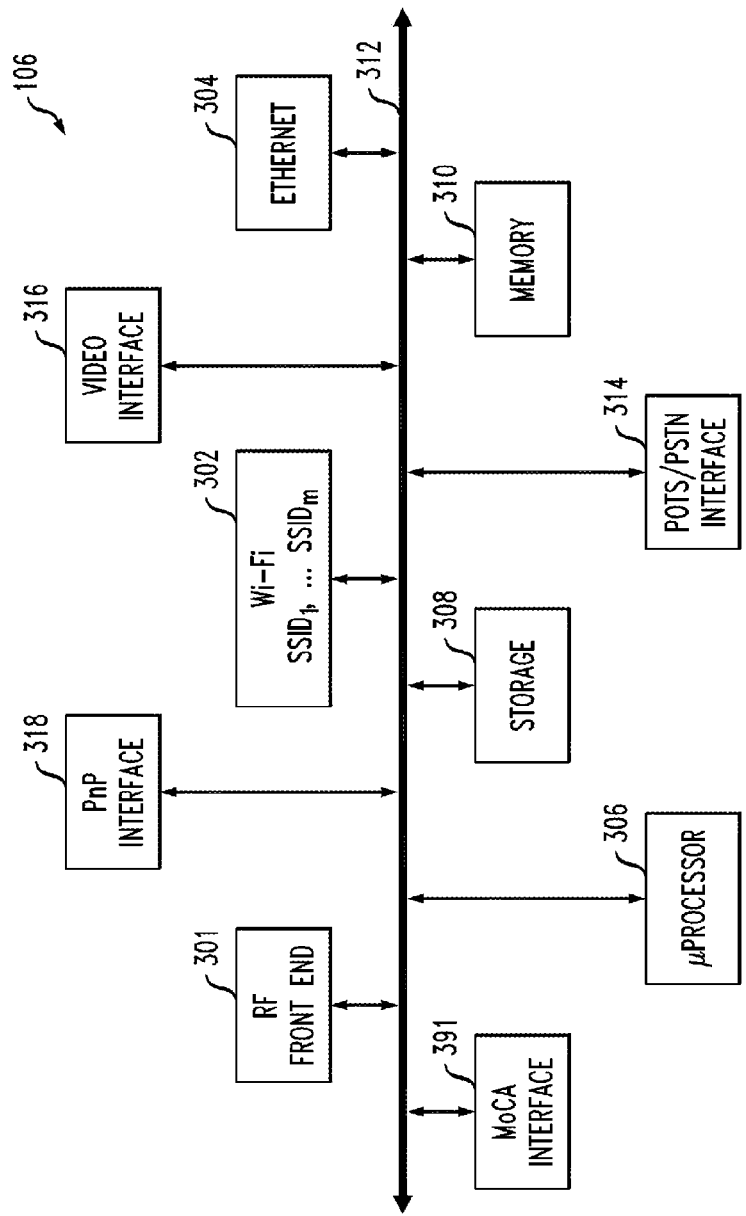
FIG. 6 is a functional block diagram of an exemplary centralized CPE unit, useful within the system of FIG. 1.

Reference should now be had to FIG. 5, which presents a block diagram of a premises network interfacing with a head end of an MSO or the like, providing Internet access. An exemplary advanced wireless gateway comprising CPE 106 is depicted as well. It is to be emphasized that the specific form of CPE 106 shown in FIGS. 5 and 6 is exemplary and non-limiting, and shows a number of optional features. Many other types of CPE can be employed in one or more embodiments; for example, any DHCP client 702 as described below, such as a cable modem, DSL modem, tablet computer, laptop computer, personal computer, network address translation (NAT) router, computing device with a wireless card in a wireless system, and the like.

CPE 106 includes an advanced wireless gateway which connects to a head end 150 or other hub of a network, such as a video content network of an MSO or the like. The head end is coupled also to an internet (e.g., the Internet) 208 which is located external to the head end 150, such as via an Internet (IP) backbone or gateway (not shown).

The head end is in the illustrated embodiment coupled to multiple households or other premises, including the exemplary illustrated household 240. In particular, the head end (for example, a cable modem termination system 156 thereof) is coupled via the aforementioned HFC network and local coaxial cable or fiber drop to the premises, including the consumer premises equipment (CPE) 106. The exemplary CPE 106 is in signal communication with any number of different devices including, e.g., a wired telephony unit 222, a Wi-Fi or other wireless-enabled phone 224, a Wi-Fi or other wireless-enabled laptop 226, a session initiation protocol (SIP) phone, an H.323 terminal or gateway, etc. Additionally, the CPE 106 is also coupled to a digital video recorder (DVR) 228 (e.g., over coax), in turn coupled to television 234 via a wired or wireless interface (e.g., cabling, PAN or 802.15 UWB micro-net, etc.). CPE 106 is also in communication with a network (here, an Ethernet network compliant with IEEE Std. 802.3, although any number of other network protocols and topologies could be used) on which is a personal computer (PC) 232.

Other non-limiting exemplary devices that CPE 106 may communicate with include a printer 294; for example over a universal plug and play (UPnP) interface, and/or a game console 292; for example, over a multimedia over coax alliance (MoCA) interface.

In some instances, CPE 106 is also in signal communication with one or more roaming devices, generally represented by block 290.

A "home LAN" (HLAN) is created in the exemplary embodiment, which may include for example the network formed over the installed coaxial cabling in the premises, the Wi-Fi network, and so forth.

During operation, the CPE 106 exchanges signals with the head end over the interposed coax (and/or other, e.g., fiber) bearer medium. The signals include e.g., Internet traffic (IPv4 or IPv6), digital programming and other digital signaling or content such as digital (packet-based; e.g., VoIP) telephone service. The CPE 106 then exchanges this digital information after demodulation and any decryption (and any demultiplexing) to the particular system(s) to which it is directed or addressed. For example, in one embodiment, a MAC address or IP address can be used as the basis of directing traffic within the client-side environment 240.

Any number of different data flows may occur within the network depicted in FIG. 5. For example, the CPE 106 may exchange digital telephone signals from the head end which are further exchanged with the telephone unit 222, the Wi-Fi phone 224, or one or more roaming devices 290. The digital telephone signals may be IP-based such as Voice-over-IP (VoIP), or may utilize another protocol or transport mechanism. The well known session initiation protocol (SIP) may be used, for example, in the context of a "SIP phone" for making multi-media calls. The network may also interface with a cellular or other wireless system, such as for example a 3G IMS (IP multimedia subsystem) system, in order to provide multimedia calls between a user or consumer in the household domain 240 (e.g., using a SIP phone or H.323 terminal) and a mobile 3G telephone or personal media device (PMD) user via that user's radio access network (RAN).

The CPE 106 may also exchange Internet traffic (e.g., TCP/IP and other packets) with the head end 150 which is further exchanged with the Wi-Fi laptop 226, the PC 232, one or more roaming devices 290, or other device. CPE 106 may also receive digital programming that is forwarded to the DVR 228 or to the television 234. Programming requests and other control information may be received by the CPE 106 and forwarded to the head end as well for appropriate handling.

FIG. 6 is a block diagram of one exemplary embodiment of the CPE 106 of FIG. 5. The exemplary CPE 106 includes an RF front end 301, Wi-Fi interface 302, video interface 316, "Plug n' Play" (PnP) interface 318 (for example, a UPnP interface) and Ethernet interface 304, each directly or indirectly coupled to a bus 312. In some cases, Wi-Fi interface 302 comprises a single wireless access point (WAP) running multiple ("m") service set identifiers (SSIDs). In some cases, multiple SSIDs, which could represent different applications, are served from a common WAP. For example, SSID 1 is for the home user, while SSID 2 may be for a managed security service, SSID 3 may be a managed home networking service, SSID 4 may be a hot spot, and so on. Each of these is on a separate IP subnetwork for security, accounting, and policy reasons. The microprocessor 306, storage unit 308, plain old telephone service (POTS)/public switched telephone network (PSTN) interface 314, and memory unit 310 are also coupled to the exemplary bus 312, as is a suitable MoCA interface 391. The memory unit 310 typically comprises a random access memory (RAM) and storage unit 308 typically comprises a hard disk drive, an optical drive (e.g., CD-ROM or DVD), NAND flash memory, RAID (redundant array of inexpensive disks) configuration, or some combination thereof.

The illustrated CPE 106 can assume literally any discrete form factor, including those adapted for desktop, floor-standing, or wall-mounted use, or alternatively may be integrated in whole or part (e.g., on a common functional basis) with other devices if desired.

Again, it is to be emphasized that every embodiment need not necessarily have all the elements shown in FIG. 6—as noted, the specific form of CPE 106 shown in FIGS. 5 and 6 is exemplary and non-limiting, and shows a number of optional features. Yet again, many other types of CPE can be employed in one or more embodiments; for example, any DHCP client 702 as described below, such as a cable modem, DSL modem, tablet computer, laptop computer, personal computer, network address translation (NAT) router, computing device with a wireless card in a wireless system, and the like.

It will be recognized that while a linear or centralized bus architecture is shown as the basis of the exemplary embodiment of FIG. 6, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC or "system-on-a-chip" (SoC). Myriad other architectures well known to those in the data processing and computer arts may accordingly be employed.

Yet again, it will also be recognized that the CPE configuration shown is essentially for illustrative purposes, and various other configurations of the CPE 106 are consistent with other embodiments of the invention. For example, the CPE 106 in FIG. 6 may not include all of the elements shown, and/or may include additional elements and interfaces such as for example an interface for the HomePlug A/V standard which transmits digital data over power lines, a PAN (e.g., 802.15), Bluetooth, or other short-range wireless interface for localized data communication, etc.

A suitable number of standard 10/100/1000 Base T Ethernet ports for the purpose of a Home LAN connection are provided in the exemplary device of FIG. 6; however, it will be appreciated that other rates (e.g., Gigabit Ethernet or 10-Gig-E) and local networking protocols (e.g., MoCA, USB, etc.) may be used. These interfaces may be serviced via a WLAN interface, wired RJ-45 ports, or otherwise. The CPE 106 can also include a plurality of RJ-11 ports for telephony interface, as well as a plurality of USB (e.g., USB 2.0) ports, and IEEE-1394 (Firewire) ports. S-video and other signal interfaces may also be provided if desired.

During operation of the CPE 106, software located in the storage unit 308 is run on the microprocessor 306 using the memory unit 310 (e.g., a program memory within or external to the microprocessor). The software controls the operation of the other components of the system, and provides various other functions within the CPE. Other system software/firmware may also be externally reprogrammed, such as using a download and reprogramming of the contents of the flash memory, replacement of files on the storage device or within other non-volatile storage, etc. This allows for remote reprogramming or reconfiguration of the CPE 106 by the MSO or other network agent.

The RF front end 301 of the exemplary embodiment comprises a cable modem of the type known in the art. In some cases, the CPE just includes the cable modem and omits the optional features. Content or data normally streamed over the cable modem can be received and distributed by the CPE 106, such as for example packetized video (e.g., IPTV). The digital data exchanged using RF front end 301 includes IP or other packetized protocol traffic that provides access to internet service. As is well known in cable modem technology, such data may be streamed over one or more dedicated QAMs resident on the HFC bearer medium, or even multiplexed or otherwise combined with QAMs allocated for content delivery, etc. The packetized (e.g., IP) traffic received by the CPE 106 may then be exchanged with other digital systems in the local environment 240 (or outside this environment by way of a gateway or portal) via, e.g. the Wi-Fi interface 302, Ethernet interface 304 or plug-and-play (PnP) interface 318.

It will be appreciated, however, that the RF front end 301 of the CPE may comprise (either in addition to or in place of the cable modem) a traditional video RF front end 301 (e.g., tuner) adapted to receive video signals over, e.g., a QAM. For example, one exemplary embodiment of the RF front end 301 comprises one or more tuners, a demodulator, decryption module, and demultiplexer of the type well known in the art, although other configurations may be used. Some embodiments are applicable to video content networks that are not carrying separate Internet traffic but are utilizing DHCP requests in connection with the transmission of video. Additionally, the RF front end 301 modulates, encrypts/multiplexes as required, and transmits digital information for receipt by upstream entities such as the CMTS or a network server. Digital data transmitted via the RF front end 301 may include, for example, MPEG-2 encoded programming data that is forwarded to a television monitor via the video interface 316. Programming data may also be stored on the CPE storage unit 308 for later distribution by way of the video interface 316, or using the Wi-Fi interface 302, Ethernet interface 304, Firewire (IEEE Std 1394), USB/USB2, or any number of other such options.

Other devices such as portable music players (e.g., MP3 audio players) may be coupled to the CPE 106 via any number of different interfaces, and music and other media files downloaded for portable use and viewing.

In some instances, the CPE 106 includes a DOCSIS cable modem for delivery of traditional broadband Internet services. This connection can be shared by all Internet devices in the premises 240; e.g. Internet protocol television (IPTV) devices, PCs, laptops, etc., as well as by roaming devices 290. In addition, the CPE 106 can be remotely managed (such as from the head end 150, or another remote network agent) to support appropriate IP services.

In some instances the CPE 106 also creates a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. For example, frequencies on the order of 1150 MHz could be used to deliver data and applications to other devices in the home such as PCs, PMDs, media extenders and set-top boxes. The coaxial network is merely the bearer; devices on the network utilize Ethernet or other comparable networking protocols over this bearer.

The exemplary CPE 106 shown in FIGS. 5 and 6 acts as a Wi-Fi access point (AP), thereby allowing Wi-Fi enabled devices to connect to the home network and access Internet, media, and other resources on the network. This functionality can be omitted in one or more embodiments.

In one embodiment, Wi-Fi interface 302 comprises a single wireless access point (WAP) running multiple ("m") service set identifiers (SSIDs). One or more SSIDs can be set aside for the home network while one or more SSIDs can be set aside for roaming devices 290.

A premises gateway software management package (application) is also provided to control, configure, monitor and provision the CPE 106 from the cable head-end 150 or other remote network node via the cable modem (DOCSIS) interface. This control allows a remote user to configure and monitor the CPE 106 and home network.

The MoCA interface 391 can be configured, for example, in accordance with the MoCA 1.0, 1.1, or 2.0 specifications.

As discussed above, the optional Wi-Fi wireless interface 302 is, in some instances, also configured to provide a plurality of unique service set identifiers (SSIDs) simultaneously. These SSIDs are configurable (locally or remotely), such as via a web page.

In addition to "broadcast" content (e.g., video programming), the systems of FIGS. 1-6 also deliver Internet data services using the Internet protocol (IP), although other protocols and transport mechanisms of the type well known in the digital communication art may be substituted. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

As noted, IP addresses are allocated in blocks known as subnets or prefixes on a network. These addresses are regularly allocated and moved as part of network growth and expansion. On a DOCSIS network, IP subnets are allocated on a per-CMTS basis.

One or more embodiments advantageously provide techniques to maintain an accurate enterprise-wide subnet to CMTS IP address allocation map.

One or more embodiments provide an automated mechanism for IP subnet discovery based upon observing dynamic host control protocol (DHCP) traffic originating from clients. When a CMTS relays a client DHCP request, it includes one of its own IP addresses in the forwarded packet. This IP address is used to trigger discovery of all IP subnets configured on the CMTS using Simple Network Management Protocol (SNMP). This approach works with DHCPv4 and DHCPv6 as they both include a CMTS address in the relayed message.

The topology discovery service preferably runs on a server in national data center 1049 while a lightweight agent preferably runs on each DHCP server 3304 in each regional data center 1048 and forwards the DHCP information up to the national topology discovery service. This national service in turn carries out topology discovery and periodically interrogates every CMTS 156-1 through 156-$n$ it has learned about for IP subnet information. The topology service does not require a preconfigured list of CMTS addresses as it automatically learns them by observing traffic they forward. This information is aggregated in a centralized database (for example, enterprise database 1051 in the national data center 1049) and made available to any interested systems. By observing DHCP messaging and communicating directly with CMTSes, one or more embodiments require no human intervention and are guaranteed to be accurate.

One or more embodiments are useful, for example, in the context of clone prevention and/or theft of service; BSS Tools (billing and business support system); and/or a PCMM (PacketCable™ Multimedia Specification) Policy Server (mark of Cable Television Laboratories, Inc., Louisville, Colo., USA). The PacketCable™ Specification—Multimedia Specification, PKT-SP-MM-I06-110629, of Cable Television Laboratories, Inc., is expressly incorporated herein by reference in its entirety for all purposes.

One or more embodiments advantageously do not require manual configuration of all CMTS IP addresses. One or more embodiments advantageously automatically discover CMTSes by observing DHCP traffic they forward. This triggers an automatic IP subnet discovery process.

There are many reasons why it is useful to know all the IP addresses that are managed or provisioned on a CMTS 156. High-speed data providers (e.g., cable providers) typically have a CMTS and have a number of IP subnets that are configured on that CMTS. The subnets are used to dynamically assign IP addresses to customers that are served by the same CMTS. The IP blocks are configured on the CMTS and also configured on the DHCP servers 3304. Depending upon what back office tools are available, some operators may have automated provisioning of the IP blocks carried out in the CMTS 156. Other operators may not have a central place they can go to and request all the IP subnet to CMTS topology information (e.g., in map or table form). One or more embodiments automatically build such a map.

Again, one or more embodiments are applicable in a variety of network situations and are not limited to the specific HFC embodiment used for illustrative purposes. In one or more embodiments, all the aforementioned IP blocks are assigned to a given CMTS. The CMTS "sees" a packet come up from a customer with an IP address in it. In one or more embodiments, based on seeing traffic from a given IP address, a determination is made as to what CMTS is providing service for the particular customer. One or more embodiments are configured to map an IP address back to an IP network which is then assigned to a CMTS.

In one or more embodiments, the IP traffic in question is coming into a server of an MSO or the like, originating from one of the MSO's customers, and the MSO needs to know what CMTS is providing the service for that customer. All that is available to the MSO to make that association is the IP address that the packet came from. Thus, in one or more embodiments, the packet in question is not necessarily from traffic coming from the world (e.g., Internet 1002). One or more embodiments advantageously allow mapping a customer's IP address to the corresponding CMTS 156.

In one or more embodiments, the MSO's customer (or a party purporting to be a customer) could be attempting to access the MSO's server for a variety of reasons; for example, legitimate reasons (access to a PCMM server) or illegitimate reasons such as an attempt to clone cable modems or the like.

In one non-limiting exemplary use case, a customer desires some kind of service change; for example, the customer desires to try out a higher speed tier or the like. The MSO needs to know what CMTS the customer is behind so the MSO can access the appropriate CMTS and tell the CMTS to apply the appropriate policy (e.g., for the desired upgraded service tier). Normally, in current systems, when the customer accesses the particular web server or the like, the MSO does not know what CMTS the customer is behind—all the MSO has is the customer's information and the IP address the customer is coming from. The MSO, in current systems, typically does not know what cable modem the customer is behind or what CMTS the customer is behind. That is to say, currently, the MSO typically does not know all of the topology information regarding the actual network between the MSO and the customer.

Thus, in one exemplary use case, an MSO's customer desires to upgrade his or her service. He or she accesses, e.g., a web site that is run by the MSO and that allows him or her to manage his or her account. He or she wants to upgrade to a faster service. All the MSO knows is what computer he or she is on at that moment but not where he or she is in the MSO's network, or what cable modem he or she is connected to. Advantageously, one or more embodiments are configured to dynamically discover where in the MSO's network (e.g., in terms of the DOCSIS side of the network) the customer is—what equipment the customer is behind (i.e., what is the path between the customer and the MSO).

In one or more embodiments, a table or similar data structure is populated over time while the MSO operates the network. Then, when subscribers come and try to carry out customer service activity or the like, the MSO has the table or similar data structure pre-built in a database.

One or more embodiments of the invention are applicable in a wide variety of scenarios. Purely by way of example and not limitation, one or more embodiments could be employed to determine the addresses of cable modems associated with a given cable modem termination system, for example, to assist in implementing aspects of the aforementioned U.S. Pat. No. 7,792,963; to implement anti cable-modem cloning functionality; to block unauthorized network traffic to facilitate consumption-based billing; and the like. Furthermore with regard to clone prevention, U.S. Pat. No. 7,895,665 to Gould et al. is entitled "System and method for detecting and reporting cable network devices with duplicate media access control addresses"; the complete disclosure of same is expressly incorporated herein by reference in its entirety for all purposes. One or more embodiments disclosed in this Gould '665 patent utilize cable modem MAC address/giaddr tuple data (gateway interface address or "giaddr" identifies the CMTS through which the cable modem is communicating). Advantageously, one or more embodiments disclosed herein can be used to discover a permanent identifier of the CMTS or other DHCP relay for use as the giaddr in one or more techniques of the Gould '665 patent, thus basing its techniques on physical topology information not dependent on what version of the Internet protocol is being employed.

Thus far, exemplary embodiments have been described in the context of a CMTS in an HFC network. However, one or more embodiments can be implemented in a variety of different kinds of networks, examples of which have been set forth elsewhere herein. One or more embodiments employ SNMP (simple network management protocol) to send and obtain data from manageable network devices. Using SNMP, it is possible to communicate with the CMTS or the like and inquire as to all of the IP networks that the CMTS has configured. One or more embodiments are configured to learn of all the CMTSes that are on the network. One or more embodiments observe DHCP traffic being relayed from the CMTS. Thus, in one or more embodiments, DHCP is the protocol used to dynamically allocate addresses to customers and devices on the network. The DHCP messages are observed. Inside of each of the DHCP messages, there is information that includes one of the IP addresses that the CMTS is configured to use. Thus, one or more embodiments obtain that IP address out of the DHCP message and then employ that IP address to communicate with the CMTS and discover all of its configured IP addresses.

In some instances, an IP address is obtained and is looked up in an existing table to see if it is known. If not known, the above-discussed SNMP communication is initiated. Periodic refreshing can be carried out; i.e., while the national system receives a feed of all the lease transactions that are occurring, at the same time, it can opportunistically query the CMTSes that it is aware of to potentially learn about changes before it sees a lease request. That is to say, outside of being triggered by a lease request, once the national system has learned of a CMTS it can periodically query that CMTS.

Figure 7:
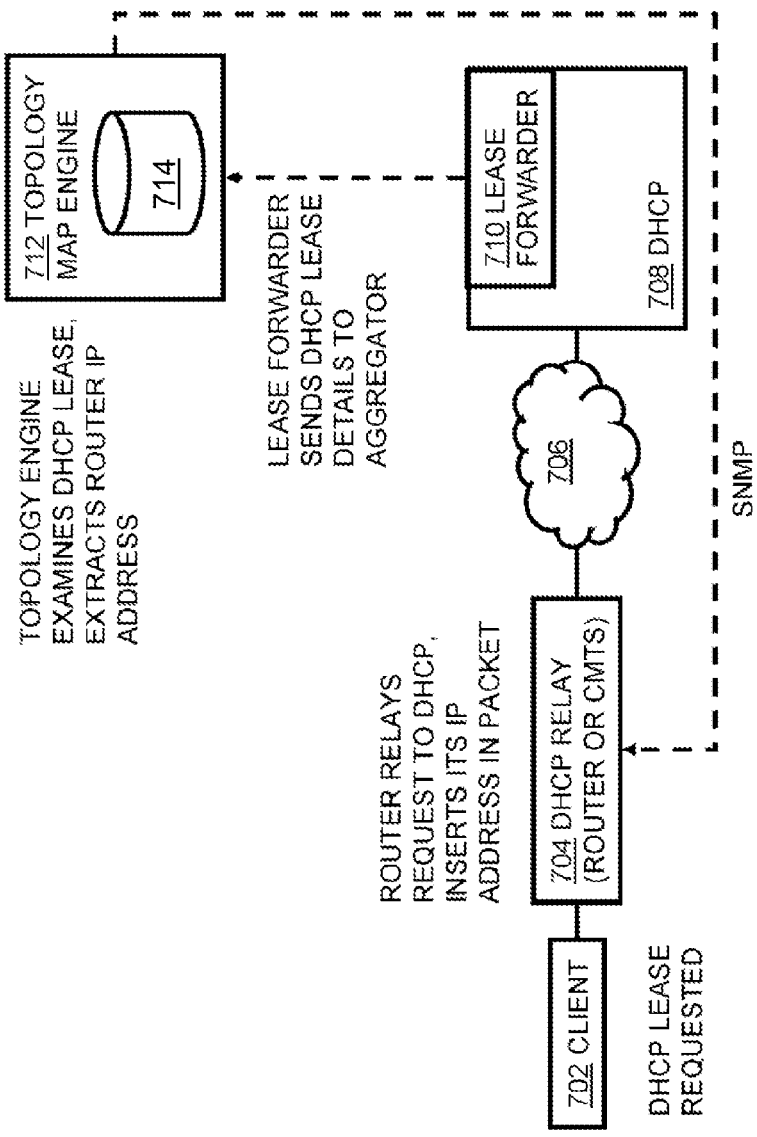
FIG. 7 is a data flow chart and block diagram of an exemplary system, according to an aspect of the invention.

Reference should now be had to FIG. 7, which depicts a non-limiting exemplary embodiment. As noted above, one or more embodiments are not limited to CMTSes, but are generally applicable wherever a dynamic host control protocol relay process is carried out. This aspect is generically referred to as a DHCP Relay 704; non-limiting examples include a CMTS 156, a DSLAM (DSL aggregator), or some other sort of router.

Client 702 (for example, the cable modem in CPE 106) requests a DHCP lease from DHCP relay 704. The DHCP Relay 704 relays the request to DHCP server 708 via network 706. When relaying the request, the DHCP Relay 704 inserts its own IP address in the packet. In a non-limiting example, DHCP Relay 704 is CMTS 156 in head end 150, network 706 is network 1046, DHCP server 708 is DHCP server 3304 in regional data center 1048, and client 702 is connected to the DHCP Relay 704 (which, in this case, is CMTS 156) via HFC network 101. Client 702 may reside, for example, in premises; engine 712 and database 714 may reside, for example, in national data center 1049. Database 714 may be part of enterprise database 1051 or may be a stand-alone database.

A lease forwarder component 710 on DHCP server 708 sends the DHCP lease details to an aggregator (e.g., into database 714 associated with topology map engine 712). Component 710 includes logic to pass the requests to engine 712. Topology map engine 712 examines the DHCP lease and extracts the IP address of the DHCP relay 704, which was inserted into the packet by DHCP Relay 704 when it relayed the DHCP lease request from client 702 to DHCP server 708.

Topology engine 712 searches the associated database 714 for the IP address of the DHCP Relay 704. If the DHCP Relay's IP address is not known, discovery of the DHCP Relay begins. If the DHCP Relay's IP address is known, database 714 is searched for the subnet containing the IP address of client 702. If the subnet is not known, the local data must be out of date, so discovery of the DHCP Relay is performed again.

One exemplary discovery process includes performing SNMP queries against the IP address of the DHCP Relay 704, as indicated by the notation "SNMP" next to the dotted line running from the topology map engine 712 to the DHCP Relay 704. The SNMP queries determine a unique identifier for the DHCP relay (which could include hostname, serial number, or loopback IP address), all network interfaces, and the IP addresses assigned to those interfaces.

Once a DHCP Relay 704 is known to the system, engine 712 preferably periodically re-polls the DHCP Relay 704 to detect if any changes were made. The topology engine 712 could, optionally, also maintain a historical view of IP address allocations including the first and/or last time a subnet was seen on a particular DHCP Relay 704, and what network interface of DHCP Relay 704 it was configured on.

Figure 9:
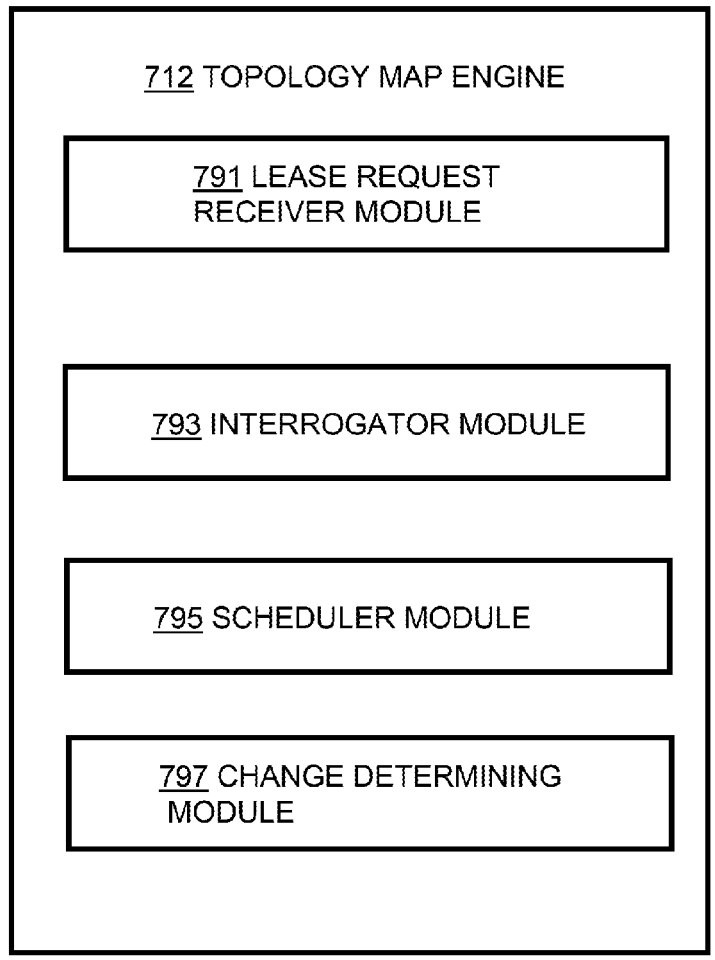
FIG. 9 is an exemplary software architecture diagram showing one software configuration for a topology map engine, according to an aspect of the invention.

Referring to FIG. 9, in some instances, topology map engine 712 includes lease request receiver module 791, interrogator module 793, optionally scheduler module 795, and change determining module 797.

Given the discussion thus far, it will be appreciated that, in general terms, an exemplary method, according to an aspect of the invention, includes the step of obtaining, at a topology map engine 712, from a dynamic host control protocol relay device 704, a relayed request, of a client 702, for a dynamic host control protocol lease. The engine 712 may run, for example, on one or more servers in the national data center 1049. Database 714 is on, or accessible to, these national data center server(s). This step can be carried out, for example, by module 791 executing on one or more hardware processors of a server in national data center 1049.

The relayed request has an internet protocol address of the dynamic host control protocol relay device 704 inserted therein. The relay device may in general have one or more IP addresses.

A further step includes searching, in a database 714, for the at least one given internet protocol address of the dynamic host control protocol relay device 704. This step can also be carried out, for example, by module 791 executing on one or more hardware processors of a server in national data center 1049.

A still further step includes, if the at least one given internet protocol address of the dynamic host control protocol relay device 704 is not found in the database 714 in the searching step, obtaining, at the topology map engine 712, from the dynamic host control protocol relay device 704, dynamic host control protocol relay device information. Such information includes an identifier of the dynamic host control protocol relay device; and at least one network interface of the dynamic host control protocol relay device and any internet protocol address assigned to the at least one network interface of the dynamic host control protocol relay device.

An even further step includes storing the dynamic host control protocol relay device information in the database 714. The steps of obtaining and storing the DHCP relay device information can also be carried out, for example, by module 791 executing on one or more hardware processors of a server in national data center 1049.

The aforementioned identifier is preferably a permanent identifier, discussed further below. One non-limiting example is a chassis number associating a modem to a CMTS chassis (i.e. association is based on the name of the CMTS rather than the specific IP addresses it has). One non-limiting exemplary use case uses topology information to make a determination as to what set of IP addresses is on a given CMTS "A"; i.e., CMTS "A" has certain IPv4 addresses and certain IPv6 addresses. Thus, when making the determination as to whether a given cable modem is cloned, rather than looking at specific IPv4 addresses, which are only relevant in the context of IPv4, topology information obtained in accordance with one or more embodiments of the invention is utilized. In this way, it does not matter whether the customer is an IPv4 customer or an IPv6 customer; the MSO can take the topology information and map it to the name of the CMTS and then make all the determinations using the CMTS's name rather than the IP address(es). Please refer to the above discussion of modem MAC address/giaddr tuple data in the Gould '665 patent wherein one or more aspects of the present invention can be used to determine a permanent identifier of the CMTS for use as the giaddr.

In one or more embodiments, if the at least one given internet protocol address of the dynamic host control protocol relay device 704 is not found in the database 714 in the searching step, a query is sent, from the topology map engine 712, back to the dynamic host control protocol relay device 704, for the dynamic host control protocol relay device information. Such information preferably includes the permanent identifier of the dynamic host control protocol relay device; all network interfaces of the dynamic host control protocol relay device; and all of the internet protocol addresses assigned to the network interfaces of the dynamic host control protocol relay device. In this regard, "all" the IP addresses could include one or more such addresses (i.e. the IP address in the relayed request and optionally one or more additional IP addresses). Optionally, prefixes not allocated using DHCP can also be included. Preferably, even if the DHCP relay device only has a single IP address, a request is still made for "all" the addresses so that it can be determined that there is only the single address.

This query-sending step can be carried out, for example, by module 793 executing on one or more hardware processors of a server in national data center 1049.

In some cases, the sending of the query, from the topology map engine, back to the dynamic host control protocol relay device, for the dynamic host control protocol relay device information, includes sending the query as a simple network management protocol (SNMP) message.

The relayed request can be an Internet Protocol Version 4 (IPv4) request or an Internet Protocol Version 6 (IPv6) request; furthermore, both kinds of requests can be handled by one or more embodiments.

In some cases, additional steps include repeating the steps of obtaining the relayed request, and searching in the database, for a relayed request from another, known, dynamic host control protocol relay device relaying a request of another client; and, responsive to at least one given internet protocol address of the known dynamic host control protocol relay device being found in the database in the repeated searching step, searching the database 714 for a subnet containing an address of the other client.

In such cases, responsive to the subnet not being found in the database, a further step can include rediscovering the known, dynamic host control protocol relay device.

Further, some instances include periodically re-polling the dynamic host control protocol relay device 704; and, in the event of a change detected by the re-polling, storing updated dynamic host control protocol relay device information in the database 714. The re-polling could be initiated, for example, by module 795 executing on one or more hardware processors of a server in national data center 1049; the change detection could be carried out, for example, by module 797 executing on one or more hardware processors of a server in national data center 1049.

The permanent identifier of the dynamic host control protocol relay device could include a hostname, a serial number, a loopback internet protocol address, a chassis number, or the like. A loopback internet protocol address is a persistent static IP address for a DHCP relay that is used for management purposes.

Furthermore, as noted, the dynamic host control protocol relay device can be, for example, a cable modem termination system or a digital subscriber line access multiplexer (DSLAM).

In some cases, the steps are repeated for a plurality of additional relayed requests from a plurality of additional dynamic host control protocol relay devices; and, based on the repeated steps, a historical log is maintained. For example, the log may include information such as first and/or last time a subnet is on a particular relay 704, and what network interface of the relay 704 the subnet was configured on.

In one or more embodiments, in the steps of querying for and obtaining the dynamic host control protocol relay information, the internet protocol addresses assigned to the network interfaces of the dynamic host control protocol relay device include the at least one given internet protocol address obtained in the relayed request, and at least one additional statically allocated internet protocol address. That is to say, one or more embodiments provide the ability to discover statically allocated addresses (e.g., for commercial customers). For example, the topology map engine can learn of a CMTS by observing dynamic lease allocation, but can also discover subnets and prefixes that are allocated statically, via communication with the CMTS.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). Appropriate interconnections via bus, network, and the like can also be included.

Figure 8:
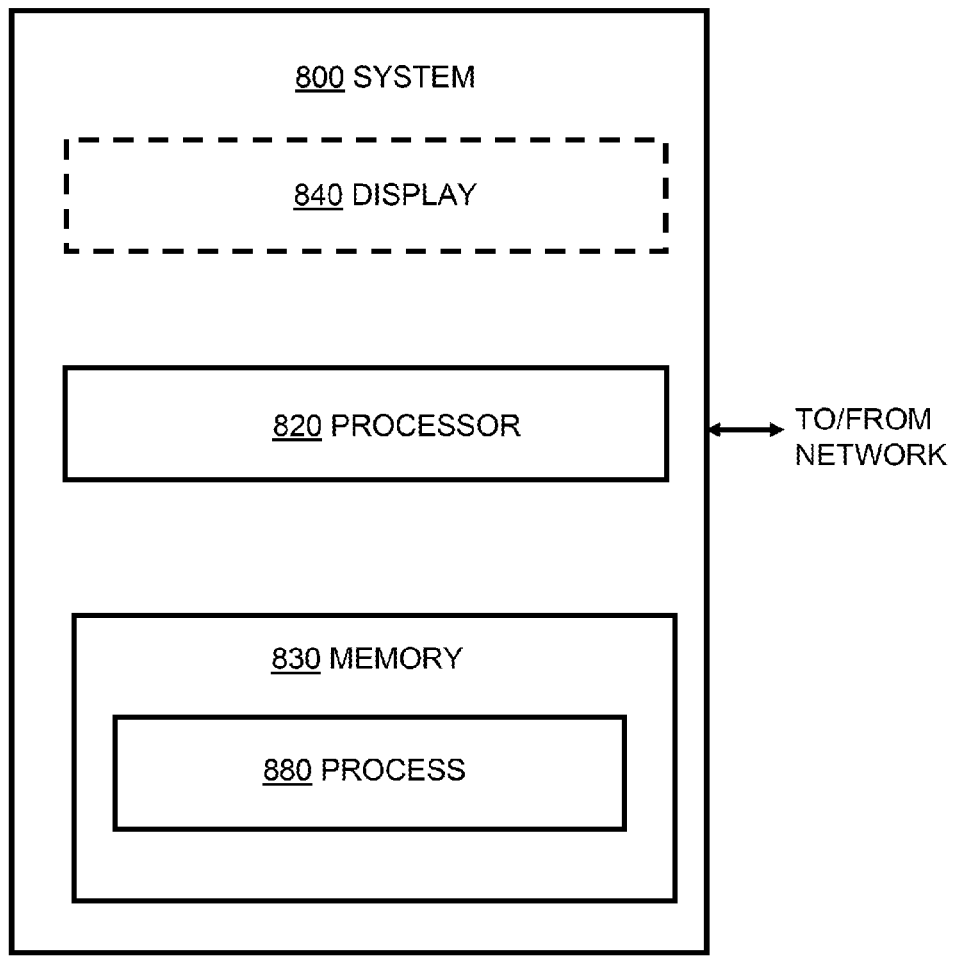
FIG. 8 is a block diagram of a computer system useful in connection with one or more aspects of the invention.

FIG. 8 is a block diagram of a system 800 that can implement at least some aspects of the invention, and is representative, for example, of one or more of the servers shown in the figures. The processor, memory, and process are also representative of aspects of the functionality of the elements 702, 704, 708, 712 in FIG. 7. As shown in FIG. 8, memory 830 configures the processor 820 to implement one or more methods, steps, and functions (collectively, shown as process 880 in FIG. 8). The memory 830 could be distributed or local and the processor 820 could be distributed or singular. Different steps could be carried out by different processors.

The memory 830 could be implemented as an electrical, magnetic or optical memory, or any combination of these or other types of storage devices. It should be noted that if distributed processors are employed, each distributed processor that makes up processor 820 generally contains its own addressable memory space. It should also be noted that some or all of computer system 800 can be incorporated into an application-specific or general-use integrated circuit. For example, one or more method steps could be implemented in hardware in an ASIC rather than using firmware. Display 840 is representative of a variety of possible input/output devices (e.g., keyboards, mice, and the like). Every processor may not have a display, keyboard, mouse or the like associated with it.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system (including, for example, system 800 or processing capability on a firewall, intrusion prevention system, or the like), to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the worldwide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass a transmission medium or disembodied signal.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program comprising computer program code means adapted to perform one or all of the steps of any methods or claims set forth herein when such program is run, for example, on a server implementing one or more of blocks 708, 710, 712, 714, and the like, and that such program may be embodied on a tangible computer readable recordable storage medium.

As used herein, including the claims, a "server" includes a physical data processing system (for example, system 800 as shown in FIG. 8) running a server program. It will be understood that such a physical server may or may not include a display, keyboard, or other input/output components. Furthermore, as used herein, including the claims, a "router" includes a networking device with both software and hardware tailored to the tasks of routing and forwarding information.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures (e.g. modules to implement blocks 708, 710, 712, 714). The method steps can then be carried out using the distinct software modules of the system, executing on one or more hardware processors. Further, a computer program product can include a tangible computer-readable recordable storage medium with code adapted to be executed to carry out one or more method steps described herein, including the provision of the system with the distinct software modules. Referring again to FIG. 9, in some instances, topology map engine 712 includes lease request receiver module 791, interrogator module 793, optionally scheduler module 795, and change determining module 797. Each of 791-797 can be implemented as distinct software modules (or sub-modules of module 712) embodied on one or more tangible computer readable storage media as just described.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
obtaining, at a topology map engine, from a dynamic host control protocol relay device, via a lease forwarder on a dynamic host control protocol server downstream of the topology map engine and upstream of the dynamic host control protocol relay device, a relayed request, of a client, for a dynamic host control protocol lease, said relayed request having at least one given internet protocol address of said dynamic host control protocol relay device inserted therein;
searching, in a database collocated with said topology map engine, for said at least one given internet protocol address of said dynamic host control protocol relay device;
if said at least one given internet protocol address of said dynamic host control protocol relay device is not found in said database in said searching step, performing an automated process to discover each of one or more internet protocol subnets configured on said dynamic host control protocol relay device, said process comprising the steps of:
obtaining, at said topology map engine, from said dynamic host control protocol relay device, dynamic host control protocol relay device information comprising at least:
an identifier of said dynamic host control protocol relay device, said identifier of said dynamic host protocol relay device being distinct from said at least one given internet protocol address of said dynamic host control protocol relay device inserted in said relayed request; and
at least one network interface of said dynamic host control protocol relay device and any internet protocol address assigned to said at least one network interface of said dynamic host control protocol relay device; and
storing said dynamic host control protocol relay device information in said database; and
repeatedly re-polling said dynamic host control protocol relay device by said topology map engine to detect changes for said dynamic host control protocol relay device information.

2. The method of claim 1, wherein in said step of obtaining said dynamic host control protocol relay device information, said identifier comprises a permanent identifier.

3. The method of claim 2, further comprising:
if said at least one given internet protocol address of said dynamic host control protocol relay device is not found in said database in said searching step, sending a query, from said topology map engine, back to said dynamic host control protocol relay device, for said dynamic host control protocol relay device information;
wherein said dynamic host control protocol relay device information comprises:
said permanent identifier of said dynamic host control protocol relay device;
all network interfaces of said dynamic host control protocol relay device; and
all internet protocol addresses, including said at least one given internet protocol address, assigned to said network interfaces of said dynamic host control protocol relay device.

4. The method of claim 3, wherein, in said step of obtaining said relayed request, said relayed request comprises an Internet Protocol Version 6 (IPv6) request.

5. The method of claim 4, further comprising repeating said steps of obtaining said relayed request, searching in said database, sending said query, obtaining said dynamic host control protocol relay device information, and storing said dynamic host control protocol relay device information, for an additional relayed request, said additional relayed request comprising an Internet Protocol Version 4 (IPv4) request.

6. The method of claim 3, further comprising:
repeating said steps of obtaining said relayed request, and searching in said database, for a relayed request from another, known, dynamic host control protocol relay device relaying a request of another client;

responsive to at least one given internet protocol address of said known dynamic host control protocol relay device being found in said database in said repeated searching step, searching said database for a subnet containing an address of said another client.

7. The method of claim 6, further comprising, responsive to said subnet not being found in said database, rediscovering said known, dynamic host control protocol relay device.

8. The method of claim 3, wherein said sending of said query, from said topology map engine, back to said dynamic host control protocol relay device, for said dynamic host control protocol relay device information, comprises sending said query as a simple network management protocol message.

9. The method of claim 3, wherein, in said step of obtaining said relayed request, said relayed request comprises an Internet Protocol Version 4 (IPv4) request.

10. The method of claim 3, wherein, in said steps of sending said query and obtaining said dynamic host control protocol relay device information, said permanent identifier of said dynamic host control protocol relay device comprises a hostname.

11. The method of claim 3, wherein, in said steps of sending said query and obtaining said dynamic host control protocol relay device information, said permanent identifier of said dynamic host control protocol relay device comprises a serial number.

12. The method of claim 3, wherein, in said steps of sending said query and obtaining said dynamic host control protocol relay device information, said permanent identifier of said dynamic host control protocol relay device comprises a loopback internet protocol address.

13. The method of claim 3, wherein, in said steps of obtaining said relayed request, sending said query, and obtaining said dynamic host control protocol relay device information, said dynamic host control protocol relay device comprises a cable modem termination system.

14. The method of claim 3, wherein, in said steps of obtaining said relayed request, sending said query, and obtaining said dynamic host control protocol relay device information, said dynamic host control protocol relay device comprises a digital subscriber line access multiplexer.

15. The method of claim 3, further comprising:
repeating said steps of obtaining said relayed request, searching in said database, sending said query, obtaining said dynamic host control protocol relay device information, and storing said dynamic host control protocol relay device information, for a plurality of additional relayed requests from a plurality of additional dynamic host control protocol relay devices; and
based on said repeated steps, maintaining a historical log.

16. The method of claim 3, wherein, in said steps of querying for and obtaining said dynamic host control protocol relay information, said internet protocol addresses assigned to said network interfaces of said dynamic host control protocol relay device comprise said at least one given internet protocol address, and at least one additional statically allocated internet protocol address.

17. The method of claim 3, wherein:
said obtaining of said relayed request is carried out by a lease request receiver module, embodied on a non-transitory computer readable medium, executing on at least one hardware processor;

said searching in said database is carried out by said lease request receiver module executing on said at least one hardware processor;

said sending of said query is carried out by an interrogator module, embodied on said non-transitory computer readable medium, executing on said at least one hardware processor;

said obtaining of said dynamic host control protocol relay device information is carried out by said lease request receiver module executing on said at least one hardware processor; and said storing of said dynamic host control protocol relay device information in said database is carried out by said lease request receiver module executing on said at least one hardware processor.

18. The method of claim 1, further comprising,
in the event of a change detected by said re-polling, storing updated dynamic host control protocol relay device information in said database.

19. A topology map engine server comprising:
a memory; and
at least one processor, coupled to said memory, and operative to:
obtain, from a dynamic host control protocol relay device, via a lease forwarder on a dynamic host control protocol server downstream of the topology map engine and upstream of the dynamic host control protocol relay device, a relayed request, of a client, for a dynamic host control protocol lease, said relayed request having at least one given internet protocol address of said dynamic host control protocol relay device inserted therein;

search, in a database collocated with said topology map engine, for said at least one given internet protocol address of said dynamic host control protocol relay device;

if said at least one given internet protocol address of said dynamic host control protocol relay device is not found in said database, perform an automated process to discover each of one or more internet protocol subnets configured on said dynamic host control protocol relay device, said process comprising the steps of:
obtaining, from said dynamic host control protocol relay device, dynamic host control protocol relay device information comprising at least:
an identifier of said dynamic host control protocol relay device, said identifier of said dynamic host protocol relay device being distinct from said at least one given internet protocol address of said dynamic host control protocol relay device inserted in said relayed request; and
at least one network interface of said dynamic host control protocol relay device and any internet protocol address assigned to said at least one network interface of said dynamic host control protocol relay device; and
storing said dynamic host control protocol relay device information in said database; and
repeatedly re-poll said dynamic host control protocol relay device by said topology map engine to detect changes for said dynamic host control protocol relay device information.

20. The topology map engine server of claim 19, wherein said identifier comprises a permanent identifier.

21. The topology map engine server of claim 20, wherein said at least one processor is further operative to:
if said at least one given internet protocol address of said dynamic host control protocol relay device is not found in said database in said searching step, send a query, from said topology map engine, back to said dynamic host control protocol relay device, for said dynamic host control protocol relay device information;

wherein said dynamic host control protocol relay device information comprises:

said permanent identifier of said dynamic host control protocol relay device;

all network interfaces of said dynamic host control protocol relay device; and all internet protocol addresses, including said at least one given internet protocol address, assigned to said network interfaces of said dynamic host control protocol relay device.

22. The topology map engine server of claim 21, wherein said relayed request comprises an Internet Protocol Version 6 (IPv6) request.

23. The topology map engine server of claim 22, wherein said at least one processor is further operative to repeat said steps of obtaining said relayed request, searching in said database, sending said query, obtaining said dynamic host control protocol relay device information, and storing said dynamic host control protocol relay device information, for an additional relayed request, said additional relayed request comprising an Internet Protocol Version 4 (IPv4) request.

24. The topology map engine server of claim 21, wherein said at least one processor is operative to send said query, from said topology map engine server, back to said dynamic host control protocol relay device, for said dynamic host control protocol relay device information, by sending said query as a simple network management protocol message.

25. The topology map engine server of claim 21, wherein said relayed request comprises an Internet Protocol Version 4 (IPv4) request.

26. The topology map engine server of claim 21, further comprising a plurality of distinct software modules, each of the distinct software modules being embodied on a computer-readable storage medium, and wherein the distinct software modules comprise a lease request receiver module and an interrogator module;

wherein:

said at least one processor is operative to obtain said relayed request by executing said lease request receiver module;

said at least one processor is operative to search in said database by executing said lease request receiver module;

said at least one processor is operative to send said query by executing said interrogator module;

said at least one processor is operative to obtain said dynamic host control protocol relay device information by executing said lease request receiver module; and said at least one processor is operative to store said dynamic host control protocol relay device information in said database by executing said lease request receiver module.

27. A non-transitory computer readable medium comprising computer executable instructions which when executed by a computer cause the computer to perform the method of:

obtaining, from a dynamic host control protocol relay device, via a lease forwarder on a dynamic host control protocol server downstream of the topology map engine and upstream of the dynamic host control protocol relay device, a relayed request, of a client, for a dynamic host control protocol lease, said relayed request having at least one given internet protocol address of said dynamic host control protocol relay device inserted therein;

searching, in a database collocated with said topology map engine, for said at least one given internet protocol address of said dynamic host control protocol relay device;

if said at least one given internet protocol address of said dynamic host control protocol relay device is not found in said database, performing an automated process to discover each of one or more internet protocol subnets configured on said dynamic host control protocol relay device, said process comprising the steps of:

obtaining, from said dynamic host control protocol relay device, dynamic host control protocol relay device information comprising at least:

an identifier of said dynamic host control protocol relay device, said identifier of said dynamic host protocol relay device being distinct from said at least one given internet protocol address of said dynamic host control protocol relay device inserted in said relayed request; and at least one network interface of said dynamic host control protocol relay device and any internet protocol address assigned to said at least one network interface of said dynamic host control protocol relay device; and storing said dynamic host control protocol relay device information in said database; and repeatedly re-polling said dynamic host control protocol relay device by said topology map engine to detect changes for said dynamic host control protocol relay device information.

28. The non-transitory computer readable medium of claim 27, wherein in said obtaining of said dynamic host control protocol relay device information, said identifier comprises a permanent identifier.

29. The non-transitory computer readable medium of claim 28, further comprising computer executable instructions which when executed by said computer cause the computer to perform the additional method steps of:

if said at least one given internet protocol address of said dynamic host control protocol relay device is not found in said database in said searching step, sending a query, from said topology map engine, back to said dynamic host control protocol relay device, for said dynamic host control protocol relay device information;

wherein said dynamic host control protocol relay device information comprises:

said permanent identifier of said dynamic host control protocol relay device;

all network interfaces of said dynamic host control protocol relay device; and all internet protocol addresses, including said at least one given internet protocol address, assigned to said network interfaces of said dynamic host control protocol relay device.

30. The non-transitory computer readable medium of claim 29, wherein said sending of said query comprises sending said query as a simple network management protocol message.

31. An apparatus comprising:

means for obtaining, at a topology map engine, from a dynamic host control protocol relay device, via a lease forwarder on a dynamic host control protocol server downstream of the topology map engine and upstream of the dynamic host control protocol relay device, a relayed request, of a client, for a dynamic host control protocol lease, said relayed request having at least one given internet protocol address of said dynamic host control protocol relay device inserted therein;

means for searching, in a database collocated with said topology map engine, for said at least one given internet protocol address of said dynamic host control protocol relay device;

means for, if said at least one given internet protocol address of said dynamic host control protocol relay device is not found in said database in said searching step, performing an automated process to discover each of one or more internet protocol subnets configured on said dynamic host control protocol relay device, said process comprising the steps of:

obtaining, at said topology map engine, from said dynamic host control protocol relay device, dynamic host control protocol relay device information comprising at least:

an identifier of said dynamic host control protocol relay device, said identifier of said dynamic host protocol relay device being distinct from said at least one given internet protocol address of said dynamic host control protocol relay device inserted in said relayed request; and at least one network interface of said dynamic host control protocol relay device and any internet protocol address assigned to said at least one network interface of said dynamic host control protocol relay device; and storing said dynamic host control protocol relay device information in said database; and means for repeatedly re-polling said dynamic host control protocol relay device by said topology map engine to detect changes for said dynamic host control protocol relay device information.

32. The apparatus of claim 31, wherein said identifier comprises a permanent identifier.

33. The apparatus of claim 32, further comprising:

means for, if said at least one given internet protocol address of said dynamic host control protocol relay device is not found in said database in said searching step, sending a query, from said topology map engine, back to said dynamic host control protocol relay device, for said dynamic host control protocol relay device information;

wherein said dynamic host control protocol relay device information comprises:

said permanent identifier of said dynamic host control protocol relay device;

all network interfaces of said dynamic host control protocol relay device; and all internet protocol addresses, including said at least one given internet protocol address, assigned to said network interfaces of said dynamic host control protocol relay device.

* * * * *